United States Patent
Sung

(10) Patent No.: US 11,407,353 B2
(45) Date of Patent: Aug. 9, 2022

(54) METHOD FOR ADJUSTING LIGHT DISTRIBUTION PATTERN OF VEHICLE LAMP AND ELECTRONIC DEVICE THEREOF

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 15 days.

(21) Appl. No.: 17/036,224

(22) Filed: Sep. 29, 2020

(65) Prior Publication Data

US 2021/0094463 A1 Apr. 1, 2021

(30) Foreign Application Priority Data

Sep. 30, 2019 (KR) .......................... 10-2019-0120572

(51) Int. Cl.
| | |
|---|---|
| *B60Q 1/08* | (2006.01) |
| *B60Q 1/00* | (2006.01) |
| *B60Q 1/076* | (2006.01) |
| *F21S 41/65* | (2018.01) |
| *G06V 20/56* | (2022.01) |
| *H04N 7/18* | (2006.01) |

(52) U.S. Cl.
CPC .......... *B60Q 1/085* (2013.01); *B60Q 1/0023* (2013.01); *B60Q 1/076* (2013.01); *F21S 41/65* (2018.01); *G06V 20/56* (2022.01); *B60Q 2300/41* (2013.01); *H04N 7/18* (2013.01)

(58) Field of Classification Search
CPC combination set(s) only.
See application file for complete search history.

(56) References Cited

U.S. PATENT DOCUMENTS 9,555,736 B2 * 1/2017 Solar ...................... G08G 1/161

FOREIGN PATENT DOCUMENTS

KR 10-2019-0007606 A 1/2019

* cited by examiner

*Primary Examiner* — Robert J May
(74) *Attorney, Agent, or Firm* — DLA Piper LLP (US)

(57) ABSTRACT

An electronic device may include: a camera module; a plurality of light source devices; and a processor operatively coupled to the camera module and the plurality of light source devices. The processor may detect a forward vehicle based on an image acquired through the camera module while a vehicle travels, identify a distance between the vehicle and the forward vehicle, and adjust light distribution patterns of the plurality of light source devices based on the identified distance.

13 Claims, 6 Drawing Sheets

METHOD FOR ADJUSTING LIGHT DISTRIBUTION PATTERN OF VEHICLE LAMP AND ELECTRONIC DEVICE THEREOF

CROSS-REFERENCE TO RELATED APPLICATION

This application claims priority from and the benefit of Korean Patent Application No. 10-2019-0120572, filed on Sep. 30, 2019, which is hereby incorporated by reference for all purposes as if set forth herein.

BACKGROUND

Field

Exemplary embodiments of the present disclosure relate to a method for adjusting a light distribution pattern of a vehicle lamp and an electronic device thereof.

Discussion of the Background

A vehicle includes a vehicle lamp (e.g. a head lamp) which emits light to a forward area of the vehicle, such that a driver can check an object located around the vehicle during night driving. The vehicle lamp may include a low beam configured to emit light to a short distance and a high beam configured to emit light to a long distance.

Recently, ADB (Adaptive Drive Beam) technology has been applied to a vehicle, which identifies an object (e.g. an on-coming vehicle, pedestrian or forward vehicle) from an image obtained by filming a forward area of a vehicle, in order to prevent damage caused by a high beam (e.g. light glare that enters the eyes of a driver of an on-coming vehicle, a pedestrian, or a driver of a forward vehicle), and adjusts a light distribution pattern of a vehicle lamp such that the high beam does not emit light to the location of the identified object.

The related art of the present disclosure is disclosed in Korean Patent Application No. 10-2019-0007606 published on Jan. 23, 2019 and entitled "Lamp Control Device for Vehicle".

The ADB technology may decide the location of a forward vehicle ahead of a vehicle from an image obtained by filming a forward area of the vehicle through a camera module, and adjust a light distribution pattern of a vehicle lamp based on the decided location. However, as the location of the camera module to film the forward area of the vehicle is different from the location of the vehicle lamp, the light distribution pattern of the vehicle lamp may be distorted. Since the location of the forward vehicle is decided based on angle information, the light distribution pattern may be further distorted as the distance between the vehicle and the forward vehicle decreases. Therefore, there is a demand for a solution for preventing distortion in light distribution pattern of a vehicle lamp in a vehicle to which the ADB technology is applied.

SUMMARY

Various embodiments are directed to a method and apparatus for preventing distortion in light distribution pattern of a vehicle lamp by location tolerance between a camera module and the vehicle lamp in a vehicle to which the ADB technology is applied.

In an embodiment, an electronic device may include: a camera module; a plurality of light source devices; and a processor operatively coupled to the camera module and the plurality of light source devices. The processor may detect a forward vehicle based on an image acquired through the camera module while a vehicle travels, identify a distance between the vehicle and the forward vehicle, and adjust light distribution patterns of the plurality of light source devices based on the identified distance.

In an embodiment, an operating method of an electronic device may include: detecting, by a processor of the electronic device, a forward vehicle based on an image acquired through a camera module of the electronic device, while a vehicle travels; identifying, by the processor, a distance between the vehicle and the forward vehicle; and adjusting, by the processor, light distribution patterns of a plurality of light source devices of the electronic device, based on the identified distance.

In accordance with the embodiments of the present disclosure, the electronic device and the operating method thereof can adjust a light distribution pattern of a vehicle lamp based on a distance between a vehicle and a forward vehicle in the vehicle to which the ADB technology is applied, thereby preventing distortion in light distribution pattern of the vehicle lamp by location tolerance between a camera module and the vehicle lamp.

DETAILED DESCRIPTION OF THE ILLUSTRATED EMBODIMENTS

Figure 1:
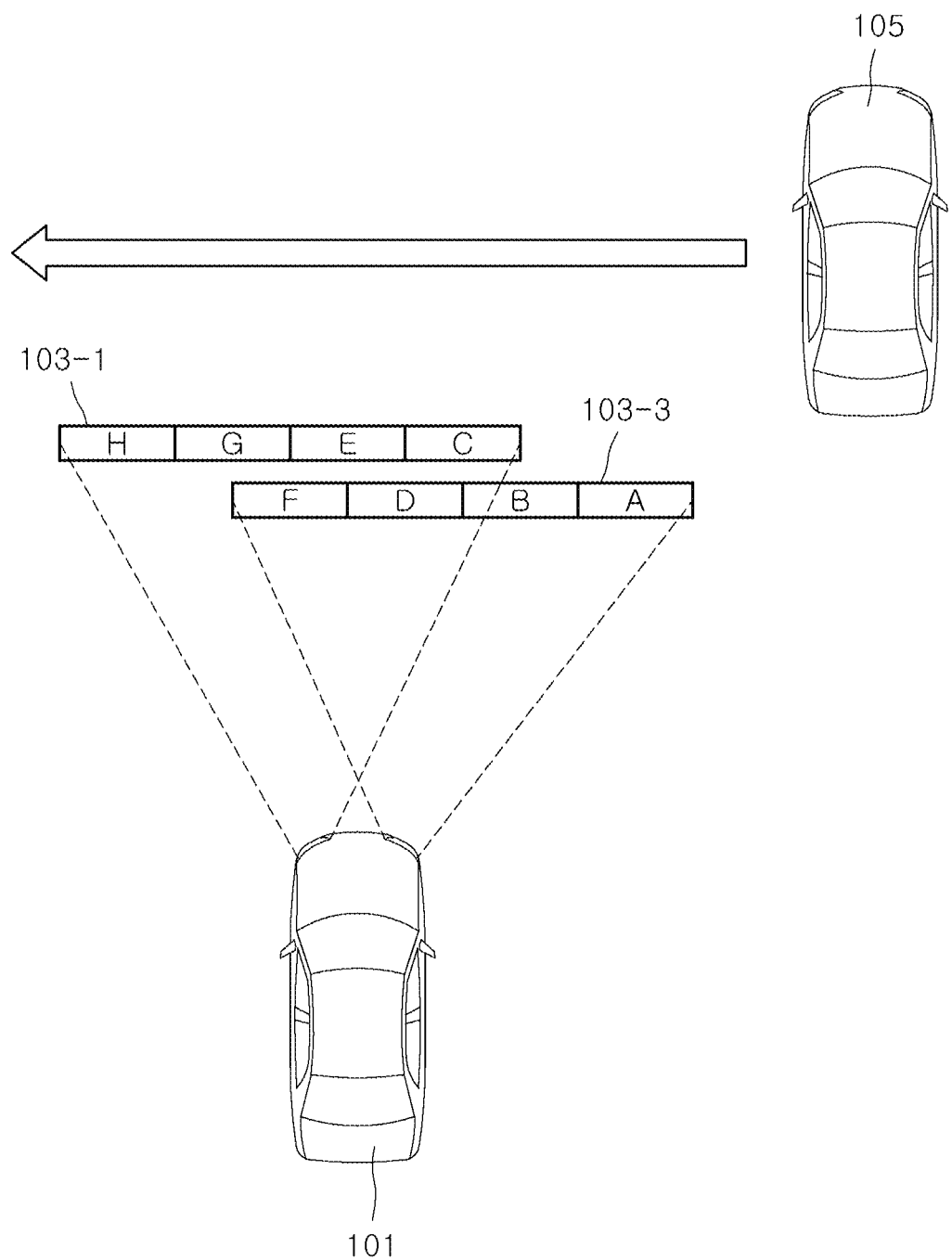
FIG. 1 is a diagram for describing ADB technology in accordance with various embodiments.

Hereafter, various embodiments of the present disclosure will be described with reference to the accompanying drawings. It should be noted that the embodiments and terms used in the embodiments do not limit the technology described in this specification to a specific embodiment, but include various modifications, equivalents and/or substitutes of the corresponding embodiment. In relation to the descriptions of the drawings, like reference numerals may be used for similar components. The terms of a singular form may include plural forms unless referred to the contrary. In this specification, an expression such as "A or B" or "one or more of A and B" may include all possible combinations of items listed together. Expressions such as "first" and "second" may describe the corresponding elements regardless of order or importance. The expressions are only used to distinguish one element from another element, and do not limit the corresponding elements. When a certain (for example, first) element is referred to as being (functionally or communicationally) "coupled" or "connected" to another (for example, second) element, the former element may be directly coupled to the latter element, or coupled to the latter element through another element (for example, a third element).

In this specification, an expression "configured to" may be used interchangeably with "suitable for", "having an ability to", "changed to", "made to" "capable of" or "designed to" in hardware or software manner. In a certain situation, an expression "device configured to" may indicate that the device can perform something with another device or other parts. For example, an expression "processor configured to perform A, B and C may indicate a dedicated processor (e.g. an embedded processor) for performing a corresponding operation or a general processor (e.g. a CPU or application processor) capable of performing the corresponding operation by executing one or more software programs stored in a memory device.

Figure 2A:
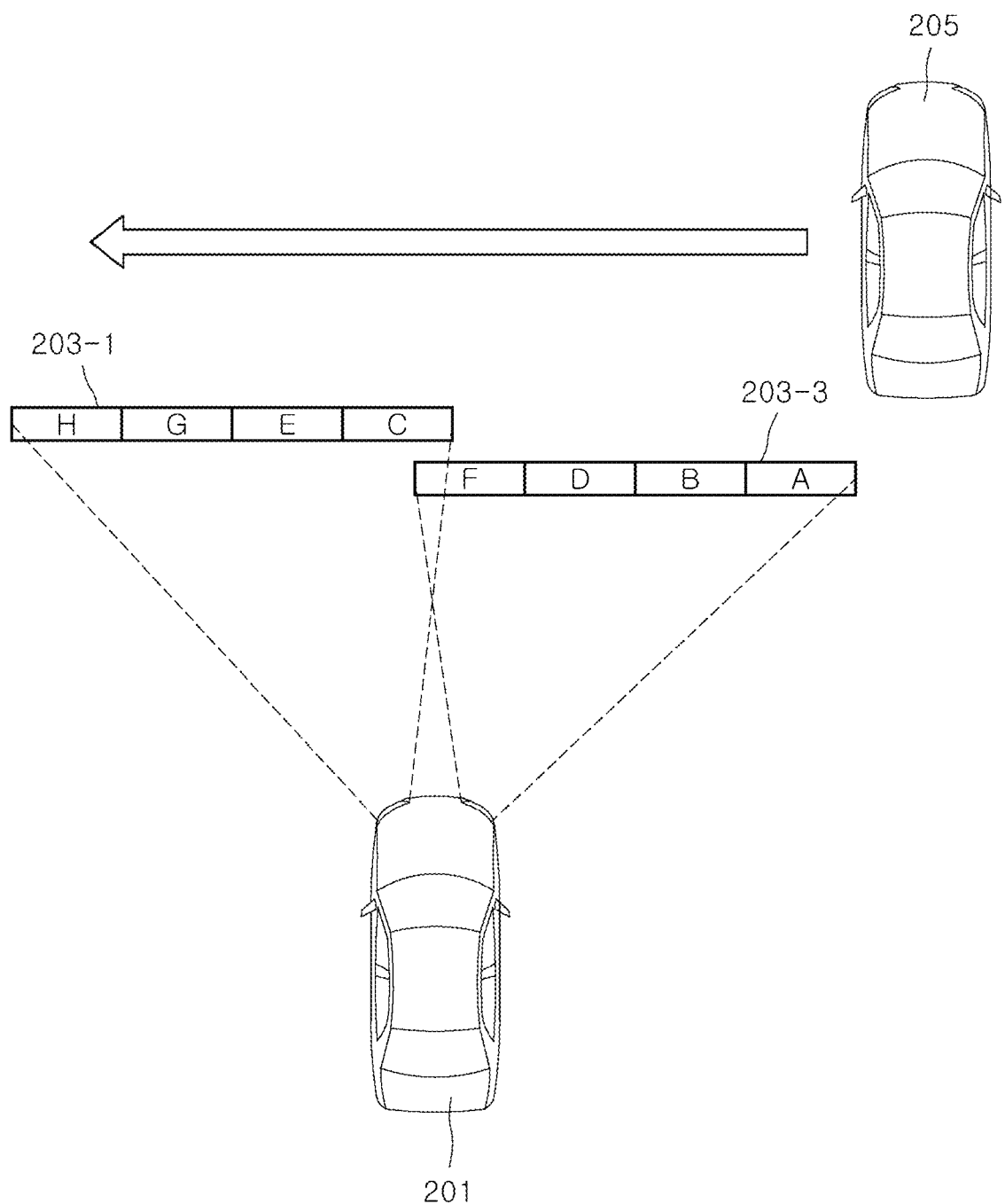
FIGS. 2A and 2B are diagrams for describing a method for compensating for distortion in light distribution pattern based on a distance in a vehicle to which the ADB technology in accordance with the various embodiments is applied.
Figure 2B:
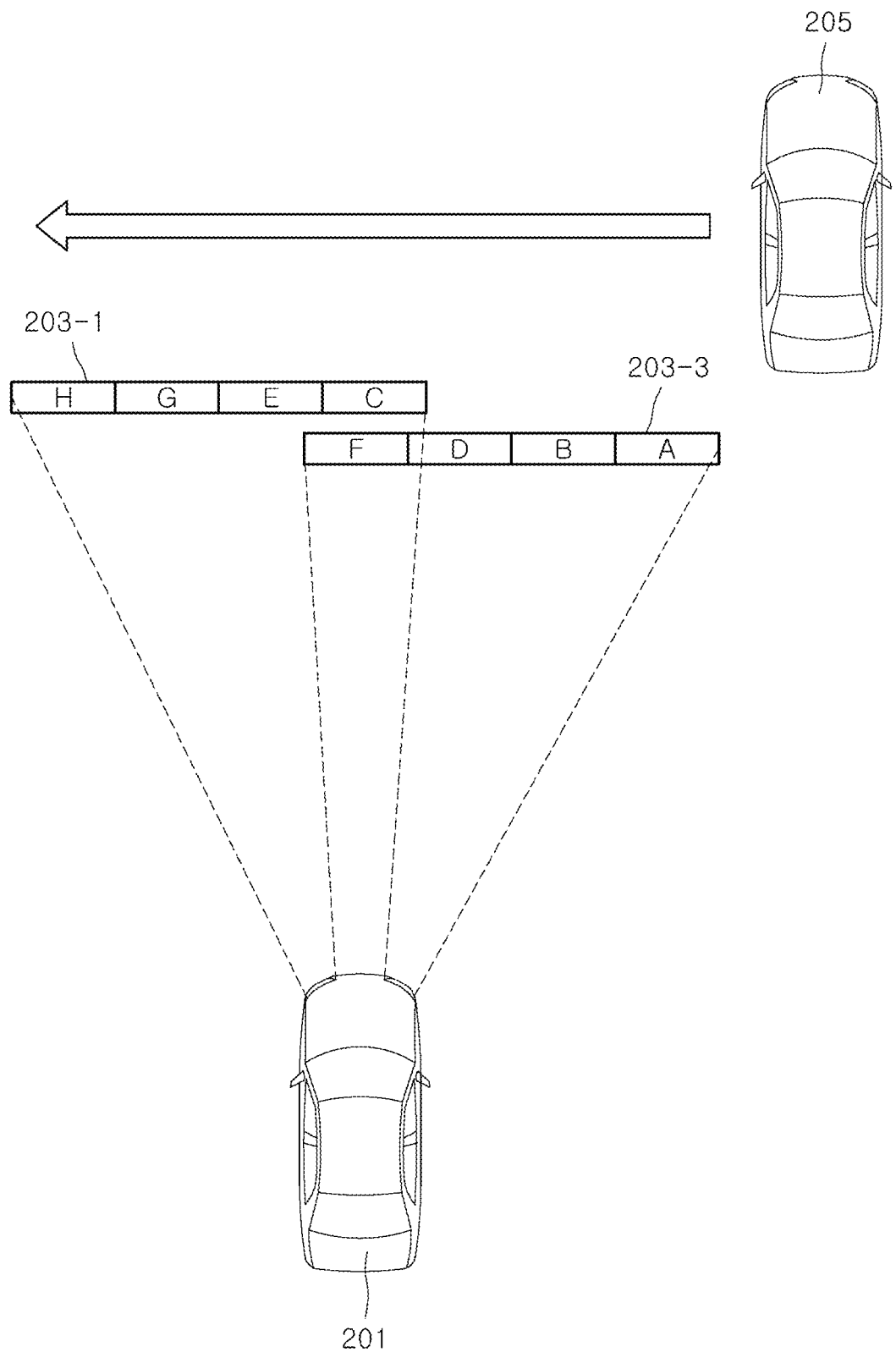

FIG. 1 is a diagram for describing ADB technology in accordance with various embodiments. FIGS. 2A and 2B are diagrams for describing a method for compensating for distortion of a light distribution pattern based on a distance in a vehicle to which the ADB technology in accordance with the various embodiments is applied.

In accordance with various embodiments, a vehicle 101 may emit light to a forward area of the vehicle 101 through a light source device, in response to detection of a driver's input or a designated situation (for example, nighttime).

In accordance with various embodiments, the vehicle 101 may adjust a light distribution pattern of the light source device in order to prevent damage (e.g. light glare) to a driver of a forward vehicle 105, in response to identification of the forward vehicle 105 moving from the right to the left of the vehicle 101 through a camera module. For example, the vehicle 101 may control a first light source device (e.g. a right head lamp of the vehicle) and a second light source device (e.g. a left head lamp of the vehicle) of the vehicle to sequentially turn off lights which are emitted as distributed lights corresponding to a moving location of the forward vehicle 101, between a first light distribution pattern 103-1 (A, B, D and F) of the first light source device and a second light distribution pattern 103-3 (C, E, G and H) of the second light source device. For example, the vehicle 101 may control the first and second light source devices to sequentially turn off the lights in order of A, B, C, D, E, F and G, according to the movement of the forward vehicle 105.

In accordance with various embodiments, the light distribution pattern of the light source device of the vehicle 101 may be distorted by location tolerance between the camera module for detecting the location of the forward vehicle and the light source device for emitting light. For example, as illustrated in FIG. 2A, the camera module may be disposed in the center of the windshield of the vehicle, and the light source device may be located on the right or left side of the front of the vehicle. In this case, a first light distribution pattern 203-1 of the first light source device may be moved to the right of the vehicle and formed, and a second light distribution pattern 203-3 of the second light source device may be moved to the left of the vehicle and formed. Thus, when the lights are sequentially turned off in order of A, B, C, D, E, F and G, for example, when the light distribution patterns are not distorted, light glare may enter the eye of the driver of the forward vehicle 205.

In accordance with various embodiments, the vehicle 101 may adjust the light distribution patterns based on the distance between the vehicle 101 and the forward vehicle 105, in order to compensate for the distortion in light distribution pattern. For example, when identifying that the distance between the vehicle 201 and the forward vehicle 205 is a first distance as illustrated in FIG. 2A, the vehicle 201 may move the first light distribution pattern 203-1 to the right and move the second light distribution pattern 203-3 to the left by an adjustment amount based on the first distance, such that lights are sequentially turned off in order of A, B, D, F, C, E, G and H. For another example, when identifying that the distance between the vehicle 201 and the forward vehicle 205 is a second distance as illustrated in FIG. 2B, the vehicle 201 may move the first light distribution pattern 203-1 to the right and move the second light distribution pattern 203-3 to the left by an adjustment amount based on the second distance, such that the lights are sequentially turned off in order of A, B, D, C, F, E, G and H. In accordance with an embodiment, the adjustment amount based on the identified distance may be set to a large value as the distance between the vehicle 201 and the forward vehicle 205 decreases. The vehicle 201 may sequentially turn off the lights based on the adjusted light distribution pattern, and thus prevent damage (light glare that enters the eye of a driver of the forward vehicle) caused by the distortion in light distribution pattern.

Figure 3:
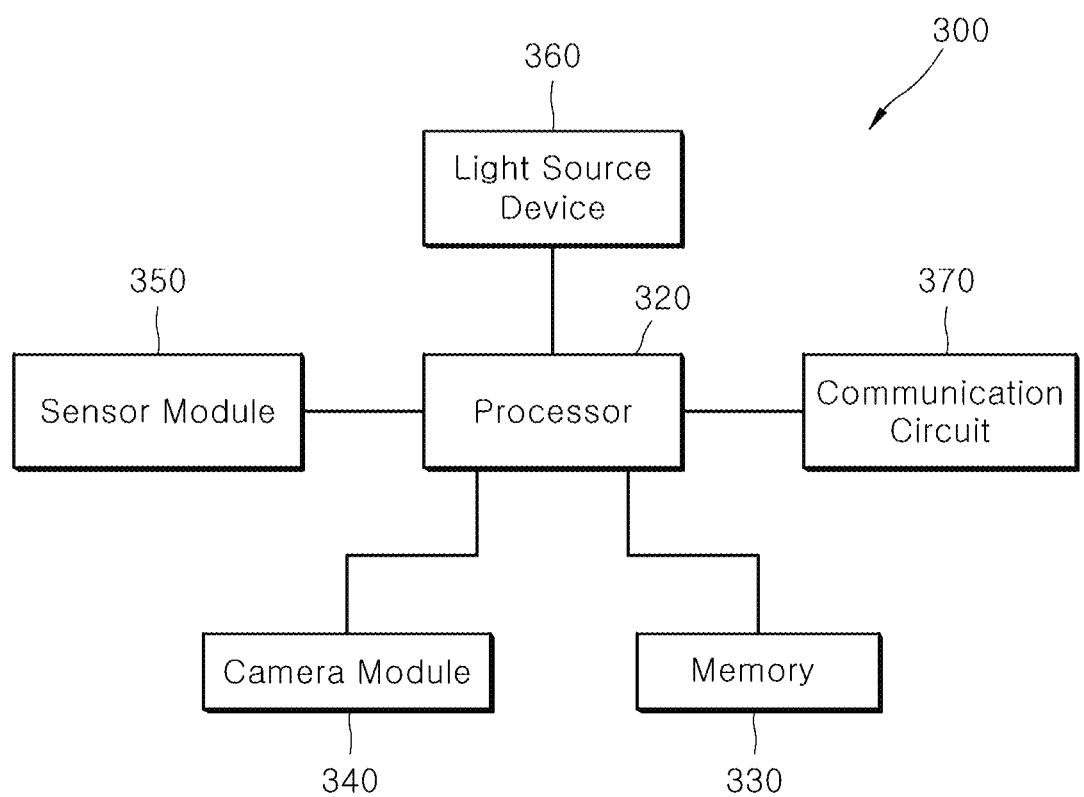
FIG. 3 is a block diagram illustrating an electronic device in accordance with various embodiments.

FIG. 3 is a block diagram illustrating an electronic device in accordance with various embodiments.

Referring to FIG. 3, the electronic device 300 may include at least some of a processor 320, a memory 330, a camera module 340, a sensor module 350, a light source device 360 and a communication circuit 370. However, the configuration of the electronic device 300 is not limited thereto. For example, the electronic device 300 may further include an output device (for example, a display or speaker) for visually or acoustically outputting information.

In accordance with various embodiments, the camera module 340 may acquire an image (e.g. static image or dynamic image) by filming the vehicle (e.g. the vehicle 101 of FIG. 1 or the vehicle 201 of FIGS. 2A and 2B). In accordance with an embodiment, the camera module 340 may include one or more lenses, image sensors, image signal processors or flashes. In accordance with an embodiment, the camera module 340 may be located in the center of the windshield of the vehicle.

In accordance with various embodiments, the sensor module 350 may measure the distance between the vehicle (e.g. the vehicle 101 of FIG. 1 or the vehicle 201 of FIGS. 2A and 2B) and the forward vehicle (e.g. the vehicle 105 of FIG. 1 or the forward vehicle 205 of FIGS. 2A and 2B). In accordance with an embodiment, the sensor module 350 may include a radar sensor, a lidar sensor, an ultrasonic wave sensor or the like.

In accordance with various embodiments, the light source device 360 may emit light to a forward area of the vehicle (e.g. the vehicle 101 of FIG. 1 or the vehicle 201 of FIGS. 2A and 2B). In accordance with an embodiment, the light source device 360 may include a plurality of LEDs (Light Emitting Diodes) or LDs (Laser Diodes), and the plurality of LEDs may be arranged in a matrix shape (e.g. an m×n matrix) in a lateral direction (for example, horizontal direction). In accordance with an embodiment, the plurality of LEDs included in the light source device 360 may be individually turned on/off under control of the processor 320. In accordance with an embodiment, the light source device 360 may include the first light source device corresponding to the right head lamp of the vehicle and the second light source device corresponding to the left head lamp of the vehicle.

In accordance with various embodiments, the communication circuit 370 may establish a wireless communication channel between the electronic device 300 and an external electronic device (e.g. an external vehicle, a roadside unit or the like), and support communication through the established communication channel.

In accordance with various embodiments, the processor 320 may drive an operating system or application to control a plurality of hardware or software components coupled to the processor 320, and to perform various data processing operations and computations. In accordance with an embodiment, the processor 320 may be implemented as an SoC (System on Chip). The processor 320 may load an instruction or data, received from at least one of the other components, to the memory 330 and process the loaded instruction or data, and store various data in the memory 330.

In accordance with various embodiments, the processor 320 may detect a forward vehicle (e.g. the forward vehicle 105 of FIG. 1 or the forward vehicle 205 of FIGS. 2A and 2B) located ahead of a vehicle (e.g. the vehicle 101 of FIG. 1 or the vehicle 201 of FIGS. 2A and 2B). For example, the processor 320 may analyze an image (or dynamic image) acquired through the camera module 340, in order to detect the forward vehicle located ahead of the vehicle.

In accordance with various embodiments, the processor 320 may identify the distance between the vehicle and the forward vehicle, in response to the detection of the forward vehicle. For example, the processor 320 may analyze image information through the camera module 340, in order to identify the distance between the vehicle and the forward vehicle. For another example, the processor 320 may identify the distance between the vehicle and the forward vehicle based on information acquired through the sensor module 350. For still another example, the processor 320 may acquire the location of the vehicle and the location of the forward vehicle through the communication circuit 370, and identify the distance between the vehicle and the forward vehicle based on the acquired locations. In this case, the processor 320 may directly receive information related to the location of the forward vehicle from the forward vehicle through data communication with the forward vehicle through the communication circuit 370, or receive information related to the location of the forward vehicle from the roadside unit using identification information of the forward vehicle, transmitted from the forward vehicle.

In accordance with various embodiments, the processor 320 may determine whether the distance between the vehicle and the forward vehicle falls within a reference distance, in response to the identification of the distance between the vehicle and the forward vehicle. In accordance with an embodiment, the reference distance may indicate the maximum distance at which the light distribution pattern may be distorted by the location tolerance between the camera module 340 and the light source device 360. The reference distance may be set to different values according to the design considerations of the light source device 360. In accordance with an embodiment, the reference distance may be periodically or aperiodically updated into different values according to the necessity of a manufacturer or an experiment result.

In accordance with various embodiments, when the distance between the vehicle and the forward vehicle falls within the reference distance, the processor 320 may adjust the light distribution pattern of the light source device 360 based on the distance between the vehicle and the forward vehicle. For example, the processor 320 may load table information from the memory 330, identify an adjustment amount of a light distribution pattern, corresponding to the distance between the vehicle and the forward vehicle, from the table information, and move the light distribution pattern of the first light source device (e.g. the right head lamp of the vehicle) included in the light source device 360 in the first direction (e.g. to the right) by the identified adjustment amount and move the light distribution pattern of the second light source device (e.g. the left head lamp of the vehicle) included in the light source device 360 in the second direction (e.g. to the left) opposite direction to the first direction by the identified adjustment amount. In accordance with an embodiment, the adjustment amount of the light distribution pattern may be set to a large value as the distance between the vehicle and the forward vehicle decreases. For example, the adjustment amount of the light distribution pattern may be set to a first value when the distance between the vehicle 201 and the forward vehicle 205 is the first distance as illustrated in FIG. 2A, and set to a second value when the distance between the vehicle 201 and the forward vehicle 205 is the second distance larger than the first distance as illustrated in FIG. 2B. The processor 320 may control the light source device 360 to turn off light which is emitted as distributed light corresponding to the location of the forward vehicle, based on the adjusted light distribution pattern.

Figure 4:
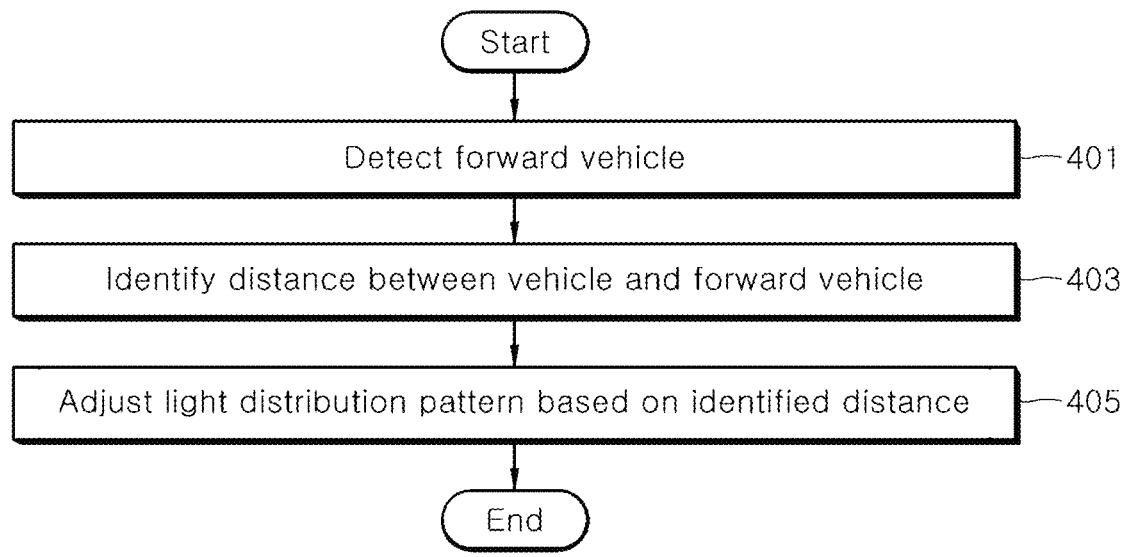
FIG. 4 is a flowchart for describing a method for adjusting a light distribution pattern of a light source device in an electronic device in accordance with various embodiments.

FIG. 4 is a flowchart for describing a method for adjusting a light distribution pattern of a light source device in an electronic device in accordance with various embodiments.

Referring to FIG. 4, a processor (e.g. the processor 320 of FIG. 3) of an electronic device (e.g. the electronic device 300 of FIG. 3) may detect a forward vehicle (e.g. the forward vehicle 105 of FIG. 1 or the forward vehicle 205 of FIGS. 2A and 2B) based on an image acquired through a camera module (e.g. the camera module 340 of FIG. 3), in operation 401. For example, the processor 320 may acquire an image (or dynamic image) by filming a forward area of the vehicle through the camera module 340 while a vehicle (e.g. the vehicle 101 of FIG. 1 or the vehicle 201 of FIGS. 2A and 2B) travels, in order to detect the forward vehicle located ahead of the vehicle by analyzing the acquired image.

In operation 403, the processor 320 may identify the distance between the vehicle and the forward vehicle, in response to the detection of the forward vehicle. For example, the processor 320 may identify the distance between the vehicle and the forward vehicle by analyzing the image (or dynamic image) acquired through the camera module 340, in response to the detection of the forward vehicle. For another example, the processor 320 may activate the sensor module 350 (e.g. a radar sensor, a lidar sensor or an ultrasonic sensor) in response to the detection of the forward vehicle, and identify the distance between the vehicle and the forward vehicle based on information acquired through the activated sensor module 350. For still another example, the processor 320 may acquire the location of the vehicle and the location of the forward vehicle through the communication circuit 370 in response to the detection of the forward vehicle, and identify the distance between the vehicle and the forward vehicle based on the location of the vehicle and the location of the forward vehicle.

In operation 405, the processor 320 may adjust the light distribution pattern based on the identified distance. For example, when the distance between the vehicle and the forward vehicle falls within the reference distance, the processor 320 may load table information from the memory 330, identify an adjustment amount of the light distribution pattern, corresponding to the distance between the vehicle and the forward vehicle, from the table information, and adjust the light distribution pattern of the light source device 360 based on the identified adjustment amount. For example, the processor 320 may move the light distribution pattern of the first light source device (e.g. the right head lamp of the vehicle) included in the light source device 360 in the first direction (e.g. to the right) by the identified adjustment amount, and move the light distribution pattern of the second light source device (e.g. the left head lamp of the vehicle) included in the light source device 360 in the second direction (e.g. to the left) opposite to the first direction by the identified adjustment amount. The processor 320 may control the light source device 360 to turn off light which is emitted as distributed light corresponding to the location of the forward vehicle, based on the adjusted light distribution pattern. In accordance with an embodiment, when the distance between the vehicle and the forward vehicle exceeds the reference distance, the processor 320 may determine that the distortion in light distribution pattern of the light source device by the location tolerance between the camera module and the light source device does not occur, and end the present algorithm. Then, the processor 320 may control the light source device 360 to turn off light, which is emitted as distributed light corresponding to the location of the forward vehicle, based on the light distribution pattern which is not adjusted.

As described above, the electronic device 300 may adjust the light distribution pattern of the light source device 360 based on the distance between the vehicle and the forward vehicle, and control the light of the light source device 360 based on the adjusted light distribution pattern, thereby preventing the distortion in light distribution pattern of the light source device 360 by the location tolerance between the camera module 340 and the light source device 360.

Figure 5:
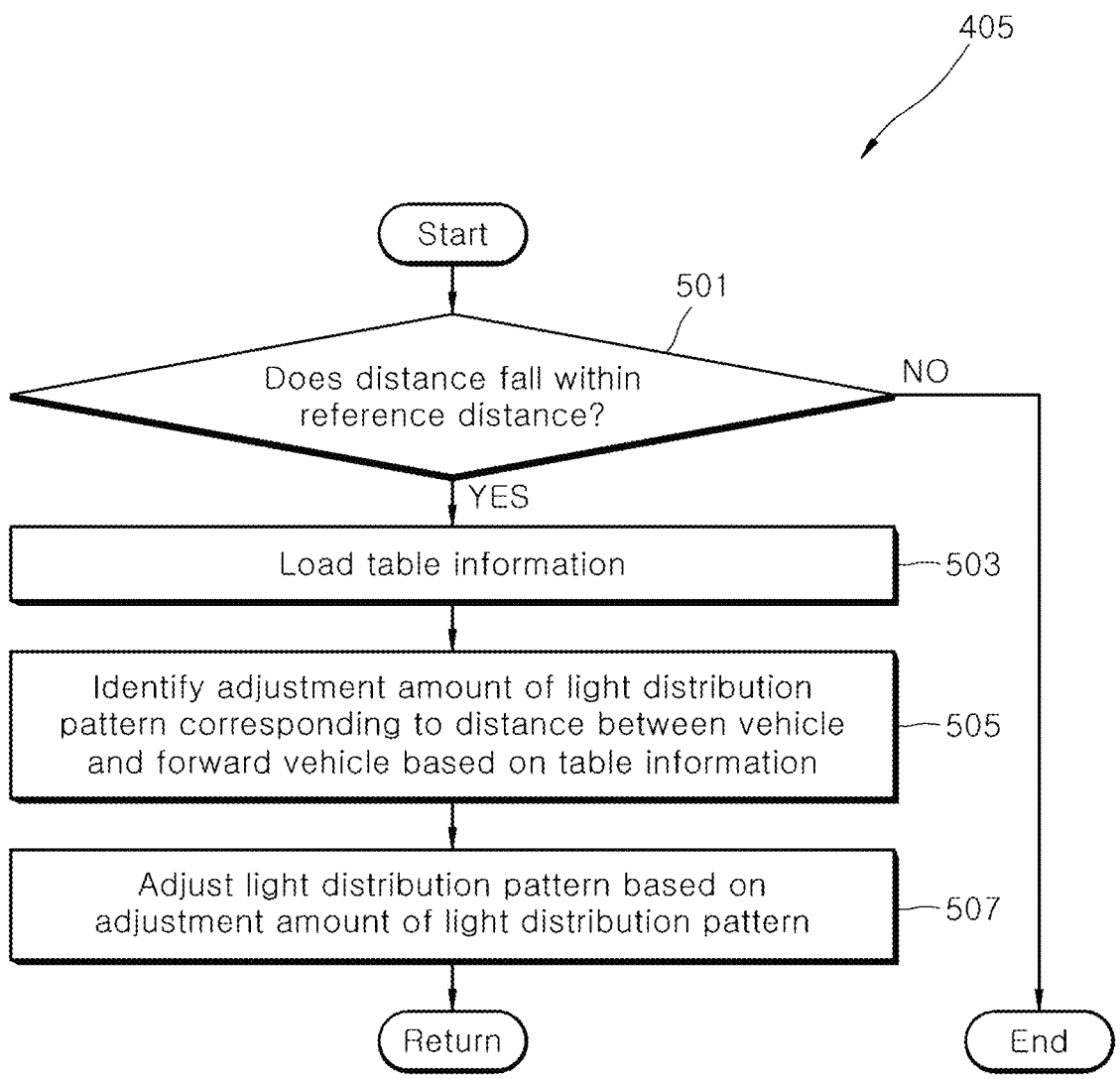
FIG. 5 is a flowchart for describing a method for adjusting a light distribution pattern of a light source device based on a distance between a vehicle and a forward vehicle in the electronic device in accordance with various embodiments.

FIG. 5 is a flowchart for describing a method for adjusting a light distribution pattern of a light source device based on a distance between a vehicle and a forward vehicle in the electronic device in accordance with various embodiments. The following descriptions may be made based on the details of the operation for adjusting the light distribution pattern based on the identified distance, in operation 405 of FIG. 4.

Referring to FIG. 5, a processor (e.g. the processor 320 of FIG. 3) of an electronic device (e.g. the electronic device 300 of FIG. 3) may determine whether the distance between a vehicle and a forward vehicle falls within a reference distance (e.g. 100 m), in operation 501. The reference distance may indicate the maximum distance at which the light distribution pattern may be distorted by the location tolerance between the camera module 340 and the light source device 360. The reference distance may be set to different values according to design considerations of the light source device 360. In accordance with an embodiment, the reference distance may be periodically or aperiodically updated into different values according to the necessity of a manufacturer or an experiment result. The processor 320 may perform operation 503 when the distance between the vehicle and the forward vehicle falls within the reference distance, and end the present algorithm when the distance between the vehicle and the forward vehicle exceeds the reference distance.

In operation 503, the processor 320 may load table information from the memory 330 when the distance between the vehicle and the forward vehicle falls within the reference distance. The table information may include a value for the adjustment amount of the light distribution pattern of the light source device 360 depending on the distance between the vehicle and the forward vehicle. The table information may be periodically or aperiodically updated into different values according to the necessity of a manufacturer or an experiment result.

In operation 505, the processor 320 may identify the adjustment amount of the light distribution pattern, corresponding to the distance between the vehicle and the forward vehicle, based on the table information. For example, when the distance between the vehicle and the forward vehicle is the first distance, the processor 320 may identify a first adjustment amount corresponding to the first distance from the table information. For another example, when the distance between the vehicle and the forward vehicle is the second distance lager than the first distance, the processor 320 may identify a second adjustment amount, which corresponds to the second distance and is smaller than the first adjustment amount, from the table information.

In operation 507, the processor 320 may adjust the light distribution pattern of the light source device 360 based on the adjustment amount of the light distribution pattern. For example, the processor 320 may move the light distribution pattern of the first light source device (e.g. the right head lamp of the vehicle) of the light source device 360 in the first direction (e.g. to the right) by the identified adjustment amount, and move the light distribution pattern of the second light source device (e.g. the left head lamp) of the light source device 360 in the second direction (e.g. to the left) by the identified adjustment amount.

The term "module" used in this specification may include a unit implemented in hardware, software or firmware. For example, the module may be used interchangeably with the term such as logic, a logical block, a part or a circuit. The module may become the minimum unit or portion of a part configured as one component or configured to perform one or more functions. In accordance with an embodiment, the module may be implemented in the form of ASIC (Application-Specific Integrated Circuit).

The various embodiments of this specification may be implemented as software including one or more instructions stored in a storage medium (e.g. the memory 330 of FIG. 3) which can be read by a machine (e.g. the electronic device 300 of FIG. 3). For example, a processor (e.g. the processor 320 of FIG. 3) of a machine (e.g. the electronic device 300 of FIG. 3) may call one or more instructions among the stored one or more instructions from the storage medium, and execute the called one or more instructions. This process may enable the machine to perform one or more functions according to the called one or more instructions. The one or more instructions may include a code generated by a compiler or a code which can be executed by an interpreter. The storage medium which can be read by the machine may be provided in the form of a non-transitory storage medium. Here, 'non-transitory' may only indicate that the storage medium is a tangible device and does not include a signal (e.g. electromagnetic wave). This term does not distinguish between the case in which data are semi-permanently stored in the storage medium and the case in which data are temporarily stored.

In accordance with various embodiments, each of the above-described components (e.g. module or program) may include a single object or a plurality of objects. In accordance with various embodiments, one or more components or operations among the above-described components may be omitted, or one or more other components or operations may be added. Alternatively or additionally, the plurality of components (e.g. modules or programs) may be integrated into one component. In this case, the integrated component may perform one or more functions of each of the components in the same or similar manner as or to the one or more functions performed by the corresponding component among the plurality of components. In accordance with various embodiments, operations performed by a module, a program or another component may be executed sequentially, in parallel, repeatedly or heuristically, one or more of the operations may be executed in a different order or omitted, or one or more other operations may be added.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic device comprising:
a camera module;
a plurality of light source devices; and
a processor operatively coupled to the camera module and the plurality of light source devices,
wherein the processor:
detects a forward vehicle based on an image acquired through the camera module while a vehicle travels,
identifies a distance between the vehicle and the forward vehicle, and
adjusts light distribution patterns of the plurality of light source devices based on the identified distances;
wherein as at least a part of the operation of adjusting the light distribution patterns of the plurality of light source devices, the processor:
decides whether the distance between the vehicle and the forward vehicle falls within a reference distance, in response to the identification of the distance between the vehicle and the forward vehicle,
loads table information from the memory when the distance between the vehicle and the forward vehicle falls within the reference distance,
identifies an adjustment amount of a light distribution pattern corresponding to the distance between the vehicle and the forward vehicle, based on the table information, and
adjusts the light distribution patterns of the plurality of light source devices based on the adjustment amount of the light distribution pattern.

2. The electronic device of claim 1, further comprising a sensor module,
wherein the processor identifies the distance between the vehicle and the forward vehicle by analyzing information acquired through the sensor module as at least a part of the operation of identifying the distance between the vehicle and the forward vehicle.

3. The electronic device of claim 2, wherein the sensor module comprises one or more of a radar sensor, a lidar sensor and an ultrasonic sensor.

4. The electronic device of claim 1, further comprising a communication circuit,
wherein as at least a part of the operation of identifying the distance between the vehicle and the forward vehicle, the processor acquires location information of the vehicle and location information of the forward vehicle through the communication circuit, and identifies the distance between the vehicle and the forward vehicle based on the location information of the vehicle and the location information of the forward vehicle.

5. The electronic device of claim 1, wherein the light source devices comprise a first light source device and a second light source device,
wherein as at least a part of the operation of adjusting the light distribution patterns of the plurality of light source devices based on the adjustment amount of the light distribution pattern, the processor
moves the light distribution pattern of the first light source device in a first direction by the adjustment amount of the light distribution pattern, and
moves the light distribution pattern of the second light source device in a second direction opposite to the first direction by the adjustment amount of the light distribution pattern.

6. The electronic device of claim 1, wherein when the distance between the vehicle and the forward vehicle exceeds the reference distance, the processor maintains the light distribution patterns of the plurality of light source devices.

7. An operating method of an electronic device, comprising:
detecting, by a processor of the electronic device, a forward vehicle based on an image acquired through a camera module of the electronic device, while a vehicle travels;
identifying, by the processor, a distance between the vehicle and the forward vehicle; and
adjusting, by the processor, light distribution patterns of a plurality of light source devices of the electronic device, based on the identified distance, wherein the adjusting of the light distribution patterns of the plurality of light source devices comprises:
deciding, by the processor, whether the distance between the vehicle and the forward vehicle falls within a reference distance, in response to the identification of the distance between the vehicle and the forward vehicle;
loading, by the processor, table information from a memory of the electronic device when the distance between the vehicle and the forward vehicle falls within the reference distance;
identifying, by the processor, an adjustment amount of a light distribution pattern corresponding to the distance between the vehicle and the forward vehicle, based on the table information; and
adjusting, by the processor, the light distribution patterns of the plurality of light source devices based on the adjustment amount of the light distribution pattern.

8. The operating method of claim 7, wherein the identifying of the distance between the vehicle and the forward vehicle comprises identifying, by the processor, the distance between the vehicle and the forward vehicle by analyzing information acquired though a sensor module of the electronic device.

9. The operating method of claim 8, wherein the sensor module comprises one or more of a radar sensor, a lidar sensor and an ultrasonic sensor.

10. The operating method of claim 7, wherein the identifying of the distance between the vehicle and the forward vehicle comprises:
acquiring, by the processor, location information of the vehicle and location information of the forward vehicle through a communication circuit of the electronic device; and identifying, by the processor, the distance between the vehicle and the forward vehicle based on the location information of the vehicle and the location information of the forward vehicle.

11. The operating method of claim 7, wherein the light source devices comprise a first light source device and a second light source device,
wherein the adjusting of the light distribution patterns of the plurality of light source devices based on the adjustment amount of the light distribution pattern comprises:
moving, by the processor, the light distribution pattern of the first light source device in a first direction by the adjustment amount of the light distribution pattern; and
moving, by the processor, the light distribution pattern of the second light source device in a second direction opposite to the first direction by the adjustment amount of the light distribution pattern.

12. The operating method of claim 7, further comprising maintaining, by the processor, the light distribution patterns of the plurality of light source devices, when the distance between the vehicle and the forward vehicle exceeds the reference distance.

13. An electronic device comprising:
a camera module;
a plurality of light source devices; and
a processor operatively coupled to the camera module and the plurality of light source devices,
wherein the processor:
detects a forward vehicle based on an image acquired through the camera module while a vehicle travels,
identifies a distance between the vehicle and the forward vehicle, and
adjusts light distribution patterns of the plurality of light source devices based on the identified distance;
wherein as at least a part of the operation of adjusting the light distribution patterns of the plurality of light source devices, the processor:
decides whether the distance between the vehicle and the forward vehicle falls within a reference distance, in response to the identification of the distance between the vehicle and the forward vehicle;
identifies an adjustment amount of a light distribution pattern corresponding to the distance between the vehicle and the forward vehicle; and
adjusts the light distribution patterns of the plurality of light source devices based on the adjustment amount of the light distribution pattern.

* * * * *